Feb. 16, 1971   P. B. GOWER ET AL   3,562,828
AUTOMATIC LASTING MACHINES
Filed Feb. 17, 1969   17 Sheets-Sheet 1

Inventors
Philip B. Gower
Jeremy C. Heal
Raymond Snape
By their Attorney

Vincent A. White

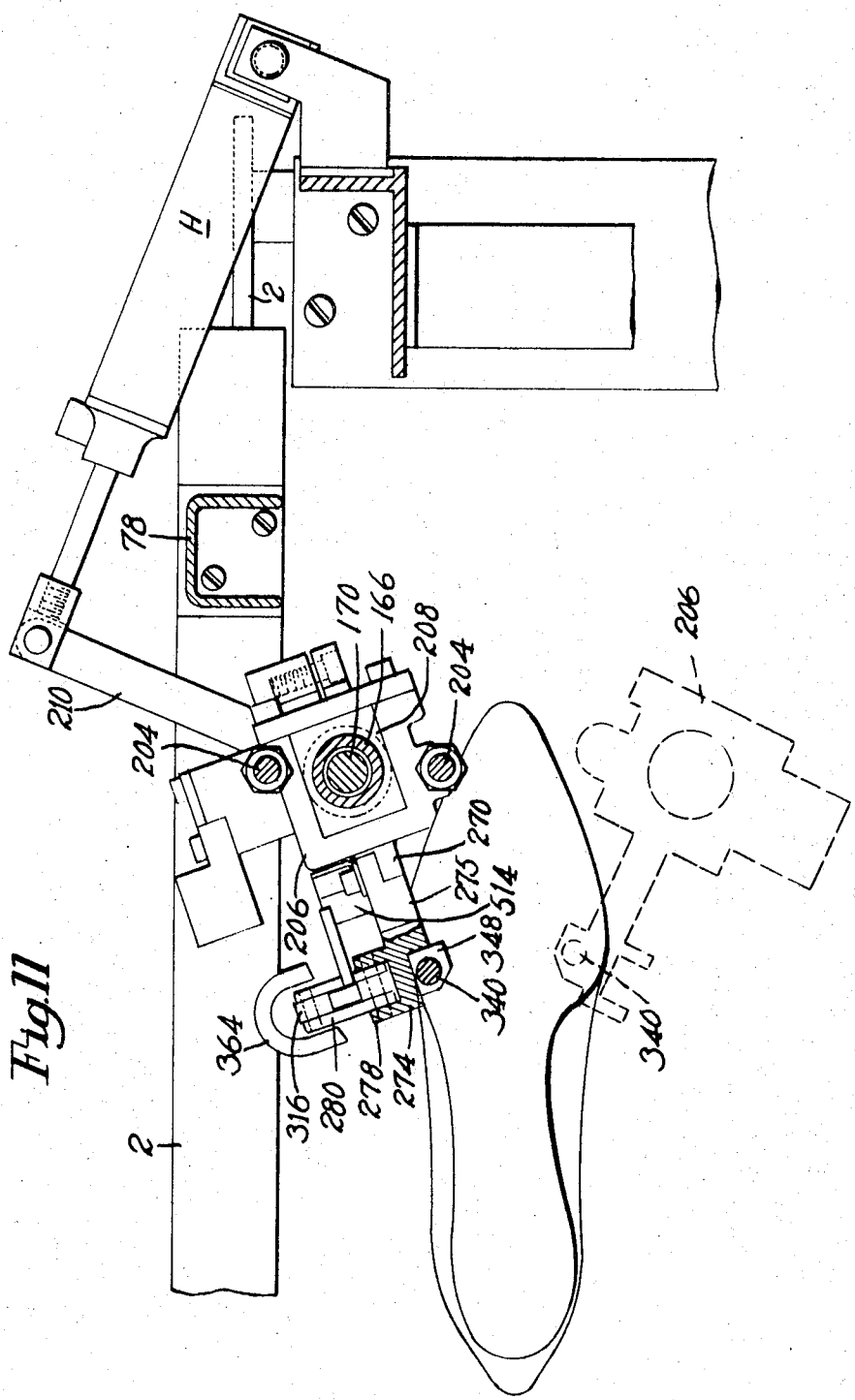

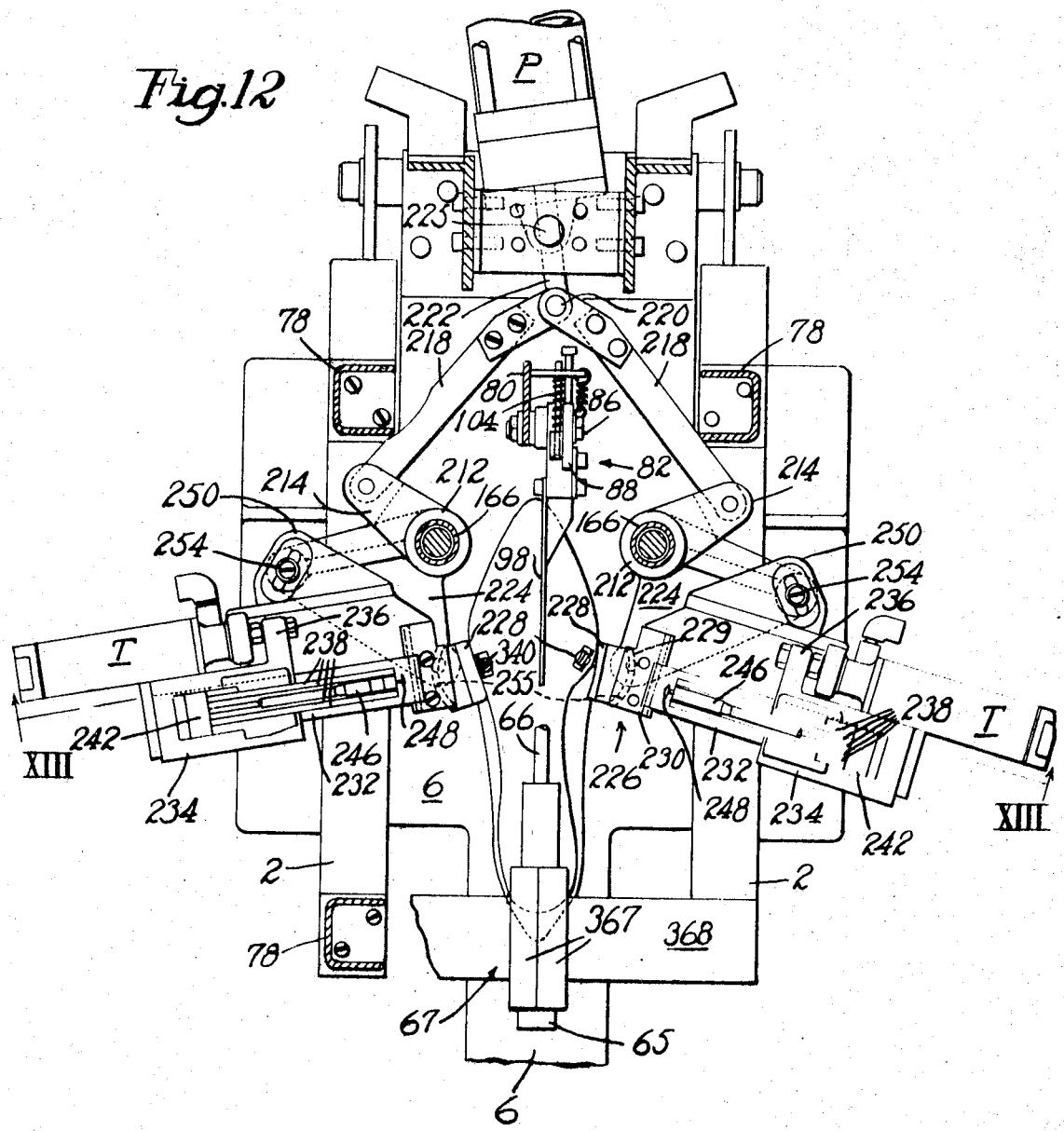

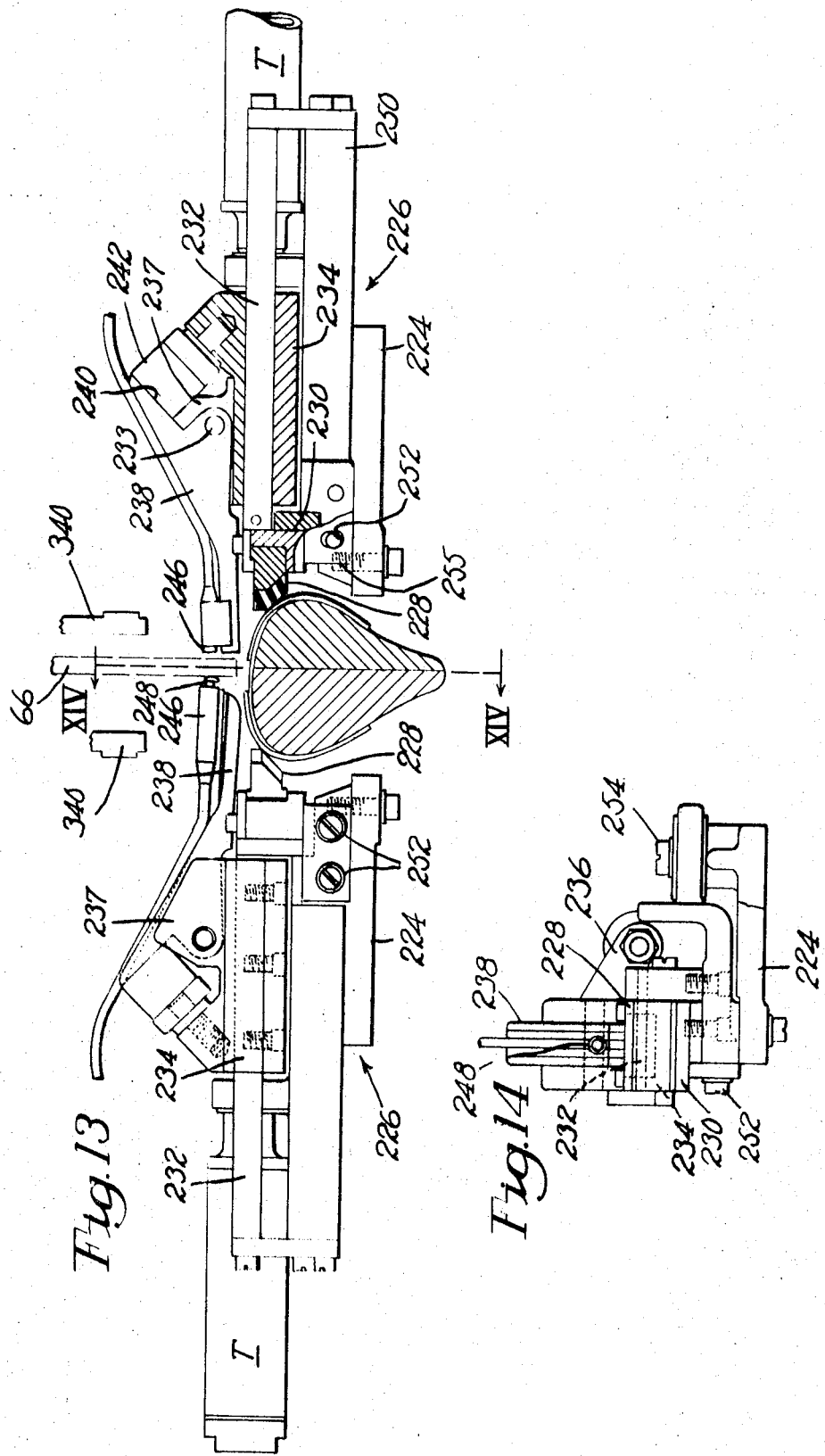

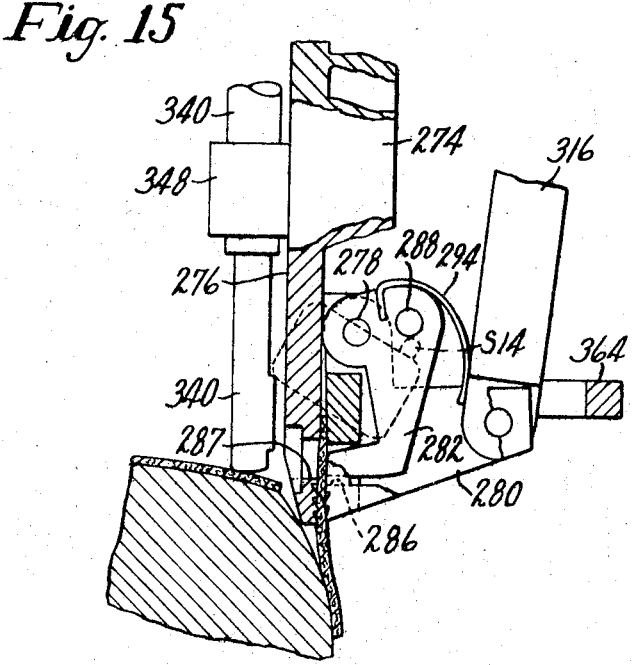
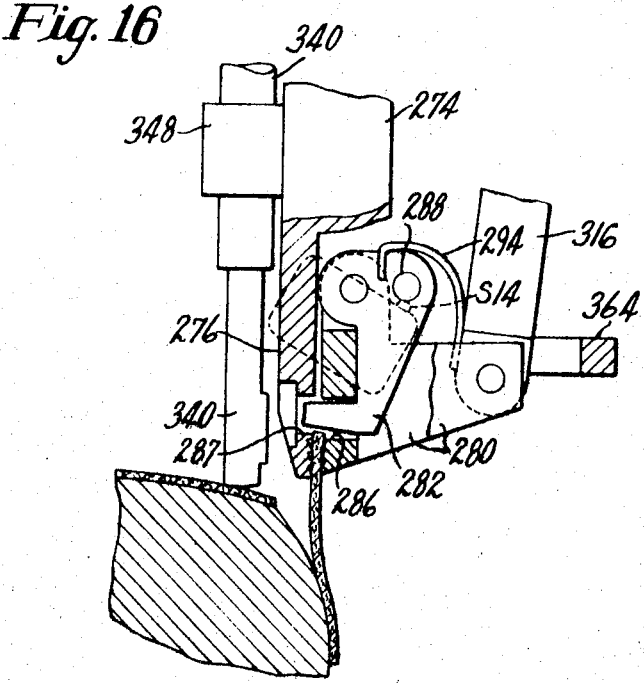

United States Patent Office 3,562,828
Patented Feb. 16, 1971

3,562,828
AUTOMATIC LASTING MACHINES
Philip B. Gower, Skipton, and Jeremy C. Heal and Raymond Snape, Leicester, England, assignors to USM Corporation, Boston, Mass., a corporation of New Jersey
Filed Feb. 17, 1969, Ser. No. 799,856
Claims priority, application Great Britain, Feb. 16, 1968, 7,606/68
Int. Cl. A43d 21/00, 23/00
U.S. Cl. 12—14.5       13 Claims

ABSTRACT OF THE DISCLOSURE

A shoe lasting machine having a support automatically orienting shoes with lasting devices which include grippers automatically located at opposite sides of each shoe and adapted to pull the upper predetermined amounts depending on whether the shoe is left or right.

BACKGROUND OF THE INVENTION

Field of the invention

The invention relates to a machine in which a shoe upper mounted on a last is pulled heightwise about the last and wiped inwardly over the shoe bottom. More particularly, the invention is directed to a machine in which a shoe is automatically oriented in the machine so portions of the shoe to be lasted are registered with grippers which pull the shoe upper at opposite sides and to wipers which wipe the tensioned upper over the shoe bottom.

Description of the prior art

Certain automatic lasting machines, for example, of the type disclosed in U.S. Pat. No. 3,376,591, are adapted to position shoes relative to lasting means by a support which is movable from a remote position where an operator places a shoe to be lasted to an operative position in which the forepart of the shoe is located by gauges. The intent of such machines is to reduce the degree of skill and labor on the part of an operator in accurately positioning the shoe with respect to lasting devices.

The gauges used must either be retracted from the shoe out of interferring relation with the lasting means or must form a part of the lasting means. Such gauges are usually useful for locating only the toe end of the forepart of the shoe where there is little difference in the symmetry between left and right shoes as well as between a variety of shoe sizes and styles. However, when it is desired to locate other portions of the shoe, such as the ball region, for lasting there may be substantial differences in symmetry between various sizes and styles of shoes and especially between right and left shoes. In general shoe supporting and locating devices heretofore available have required considerable operator skill in proper positioning of the shoe or have been unduly complex or are not suitable for general use where non-symmetrical portions of shoes are to be operated upon.

SUMMARY OF THE INVENTION

Accordingly, it is a general object of the invention to provide a lasting machine having a shoe support with locating means which, without particular operator skill, will automatically orient a variety of left and right shoes of a wide range of sizes and styles with respect to lasting devices adapted to operate on particular non-symmetrical portions of such shoes. To demonstrate the particular problem of locating a variety of shoes the machine described herein is adapted to operate on the ball area of shoes where there may be substantial differences in the symmetry of right and left shoes as well as of shoes of different sizes and styles.

The machine of the present invention is provided with a shoe support having a last pin on which an operator places the heel end of a shoe. The support is provided with automatic means for swinging the forepart of the shoe widthwise about the pin and for clamping the shoe with the median line from the center of the toe to the center of the heel of the shoe substantially centered in the machine. For shoes made on engineered lasts, which have an intelligence plate having a predetermined relation to various parts of the last, the swinging means takes the form of clamps engaging the plate. For other types of lasts, the machine is provided with centering devices engaging opposite sides of the shoe. In addition, the shoe support also provides a bar against which the shoe bottom is moved to orient the shoe heightwise.

According to one feature, the machine has means to sense the location of the portion of the shoe to be operated upon and stop movement of the support with such portion in registration with means for operating on that portion. By way of example, the sensing means comprises a finger which is engaged by the ball portion of the shoe bottom.

Another feature is based on the fact that the portions of the shoe to be operated upon usually are not symmetrically spaced from the centerline of the machine with which the median line of the shoe is registered. Accordingly, the machine is provided with means for automatically locating grippers included in the lasting means at the opposite sides of the shoe in proper positions to grip and pull the shoe upper. The locating of the grippers also determines whether the shoe is right or left and conditions the grippers to pull the upper different amounts at opposite sides of the shoe.

A further feature of the invention provides for the grippers to be adapted to grip the upper margin accurately with respect to the edge of the upper. To this end, each gripper is operated to grip the upper initially under a light force which permits the gripper to slip on the upper when tension is applied. A sensing finger associated with each gripper detects when the edge of the upper slips to a predetermined point in the gripper whereupon a greater force is applied by the gripper to prevent further slippage. Further pulling by the gripper is stopped until the sensing fingers have detected the edge of the upper at both sides of the shoe, whereupon both grippers resume their pulling action.

Other features of the invention, together with novel details of construction and combinations of parts will be described hereafter with particular reference to the drawings. The particular embodiment of the invention disclosed is described by way of exampel and not for purposes of limitation, it being understood that while the machine described is adapted to last only the ball regions of shoes, it is obvious that other portions of the shoe could be lasted and a variety of substitute mechanisms could be used without departing from the scope of the appended claims.

BRIEF DESCRIPTION OF THE DRAWINGS

FIG. 11 is a plan view of a portion of one of two upper gripper assemblies of the machine;

FIG. 12 is a plan view of a side clamping assembly and upper wiping means of the illustrative machine;

FIG. 13 is a section on the line XIII—XIII of FIG. 12, but with wiper fingers of the upper wiping means advanced;

FIG. 14 is a section of the line XIV—XIV of FIG. 13;

FIGS. 15 and 16 are enlarged views of certain parts in FIGS. 3 and 9 in positions occupied at successive stages in the cycle of operations of the illustrative machine;

SHOE SUPPORT

Figure 1:
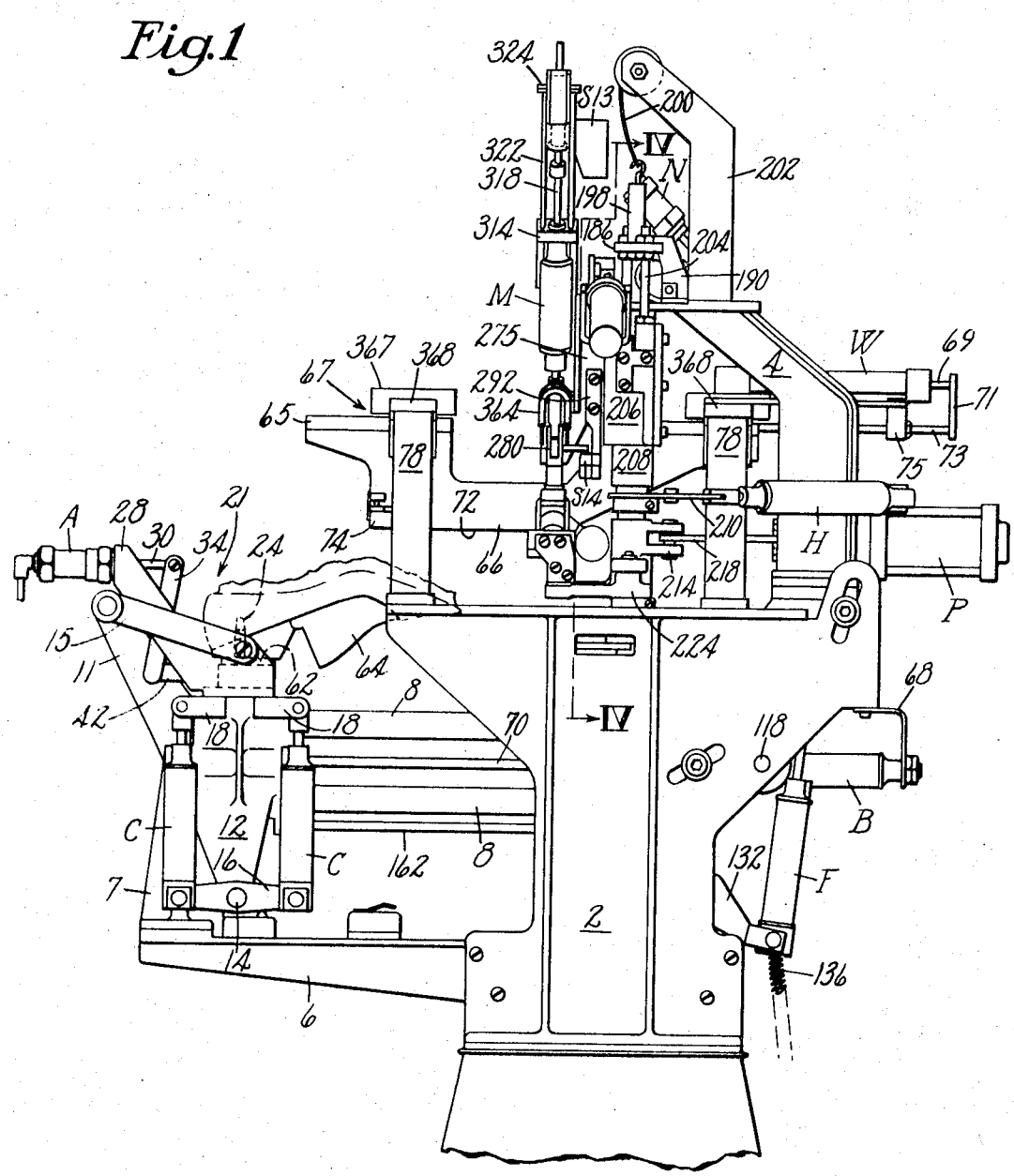
FIG. 1 is a view in right side elevation of an illustrative machine embodying the invention.
Figure 2:
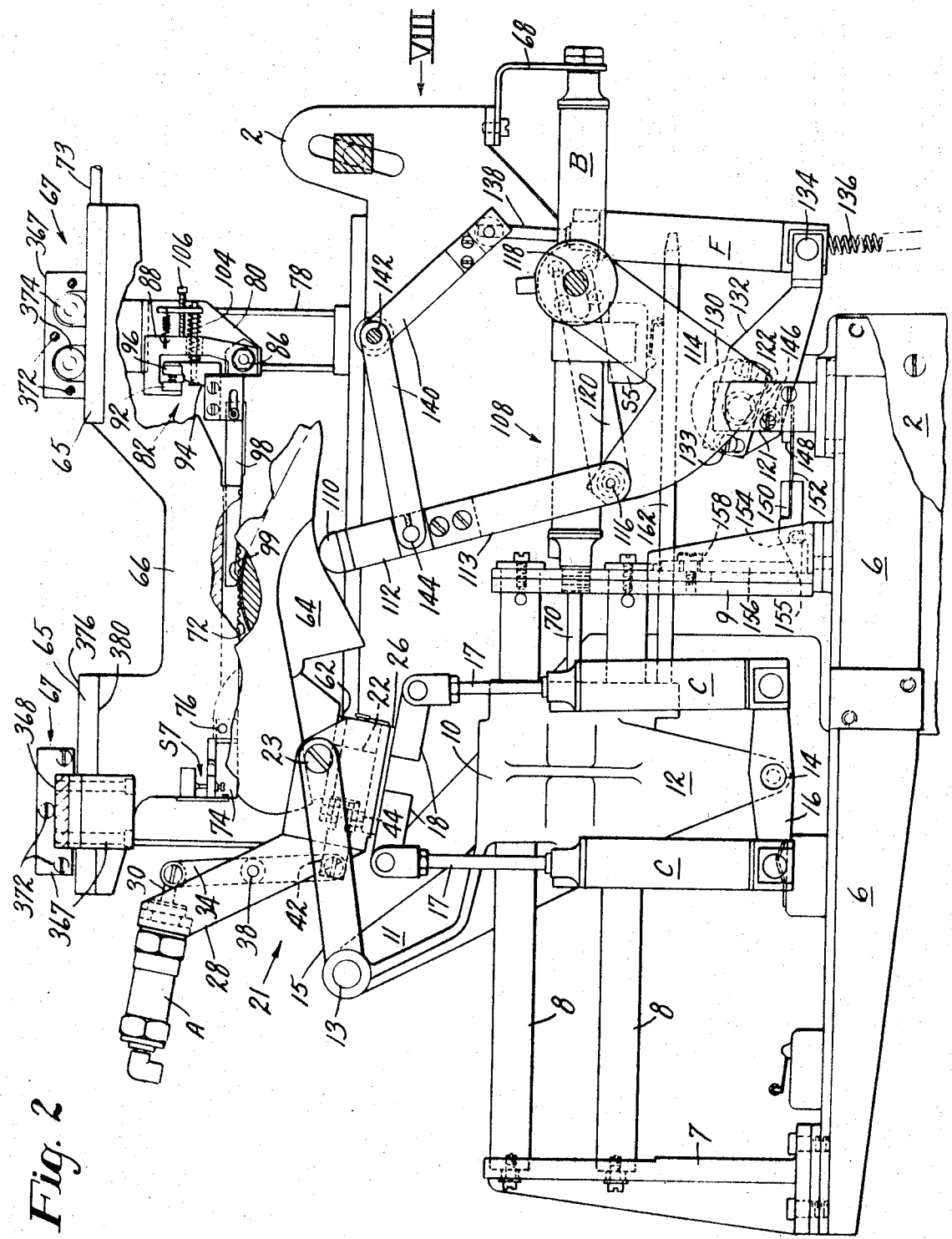
FIG. 2 is a view of shoe positioning parts of the machine at an intermediate stage in the cycle of operations of the machine.
Figure 7:
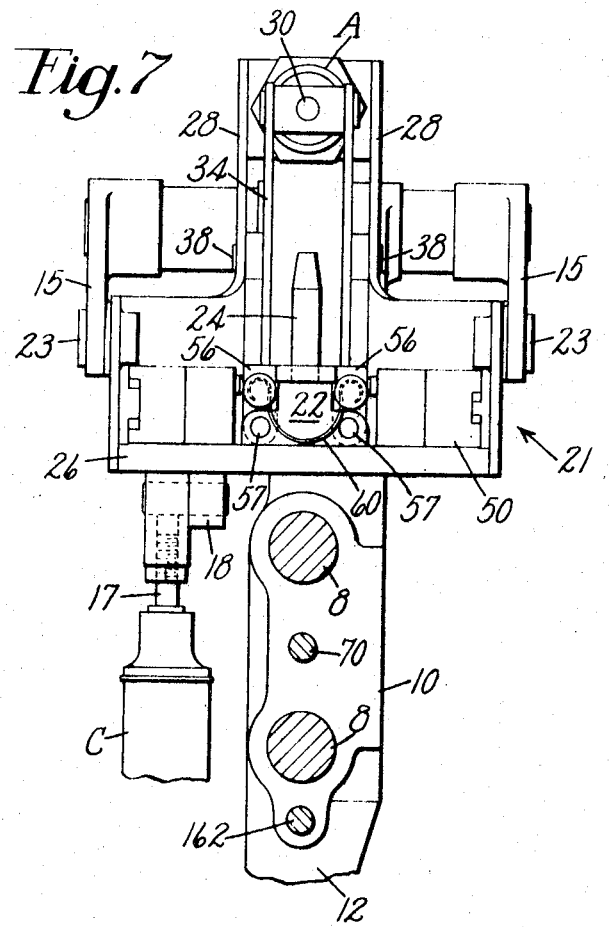
FIG. 7 is an end elevation of the mechanism shown in FIG. 6 in the direction of arrow VII of FIG. 6.

As shown in FIGS. 1 and 2, the illustrated machine includes side frames 2 carrying a bracket 6 on which a shoe support assembly 21 is mounted. The bracket carries two upstanding members 7 and 9 (FIG. 2) on which are mounted a pair of guide rods 8 slidably supporting a block 10 (see also FIG. 7). The block has a depending extension 12 having a pivot 14 for a lever 16 opposite ends of which carry a pair of cylinders C. Piston rods 17 extending upwardly from the cylinders are pivotally connected to lugs 18 of a plate 26 provided with upstanding arm 28 of the assembly 21. The plate has secured thereto a support member 22 having an upstanding last pin 24 on which a last of a shoe to be operated upon is mounted. The assembly 21 is moved heightwise by the cylinders C and is guided by a pair of links 15 connected to the assembly by studs 23, the links being pivoted on a shaft 13 mounted in an arm 11 upstanding from the block 10.

A cylinder A is secured to the upper ends of the arms 28 and has a piston rod 30 connected to the upper ends of spaced levers 34 pivoted on pins 38 extending inwardly from the arms 28. The lower ends of the levers 34 are connected by a block 42 and a pin 44 to a pair of toggle links 46 (FIG. 6) which at their outer ends are connected to members 48. These members are pivoted on pins 52 upstanding from the plate 26 and are adapted to engage outer faces of clamps 56 (see FIG. 7) pivoted on pins 57 carried in the support member 22, the clamps 56 being normally biased apart by means of a spring 60.

Figure 22:
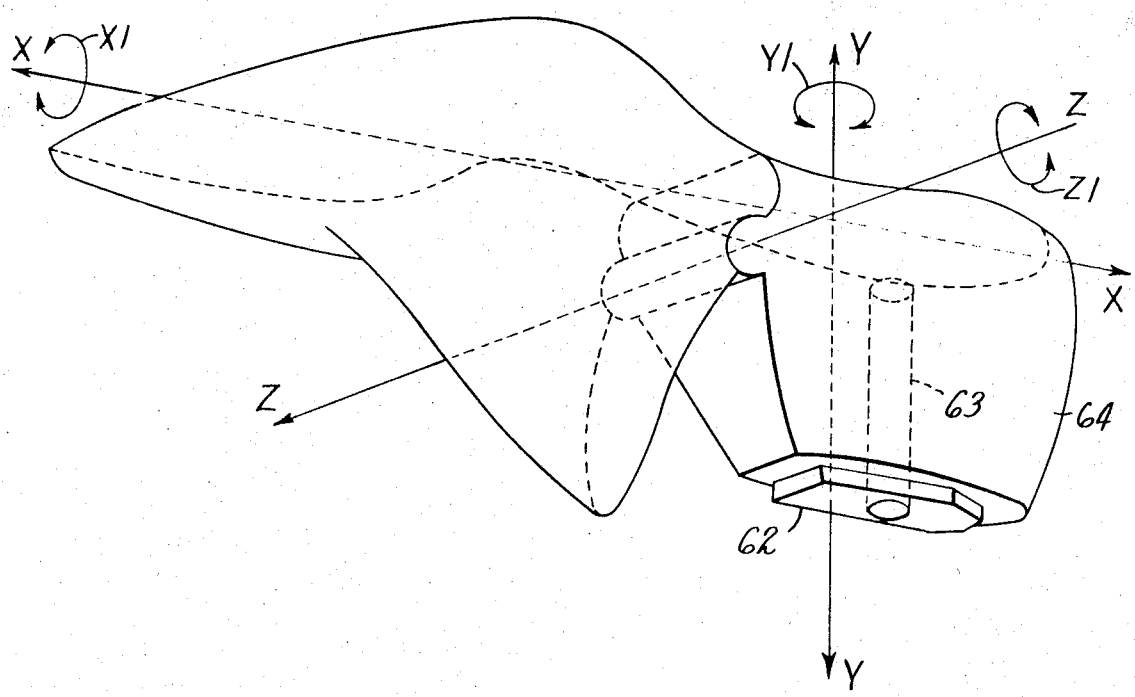
FIG. 22 is a perspective view of an engineered last showing the six directions in which the unsupported last is free to move.

Referring to FIG. 22 there is shown a last 64 of the type commonly referred to as an engineered last. Such a last is provided with a locating plate 62 and a bore 63 substantially perpendicular to the plate. The plate and the bore are accurately located with respect to the various dimensions of the last so that by positioning the last in the machine by the plate and the bore, the operating devices of the machine may be accurately oriented with respect to the various portions of the last. In the use of automatic machines of the type described herein a major problem to be overcome is that of presentation of different shoes in correct orientation to operating instrumentalities of the machine with little or no operator adjustment. Thus, in the present machine where the ball regions of the shoes are to be operated upon atuomatically by lasting means, it is essential that the ball region of each shoe be correctly positioned with respect to such operating instrumentalities. As indicated in FIG. 22, there are six possible directions in which the last may be moved. These may be summarized in relation to three axes passing through the last. One direction, referred to herein as X extends lengthwise of the last. Another, referred to as Y, extends heightwise of the last, and a third axis, referred to as Z, extends widthwise of the last. In addition, the last may also be rotated about each of these axes as indicated at X1, Y1 and Z1, respectively.

Figure 6:
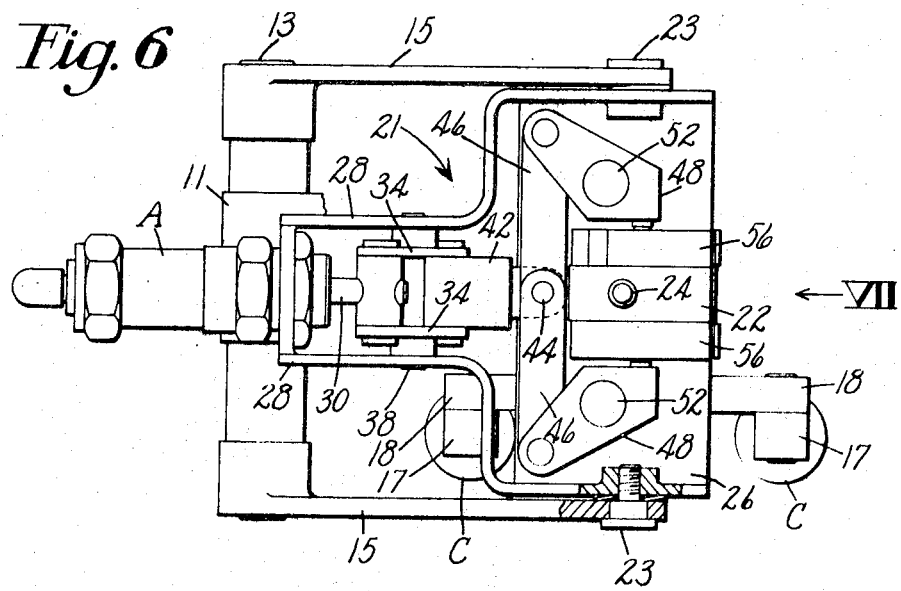
FIG. 6 is a plan view of a last climping mechanism included in FIG. 2 some parts being broken away.

Before commencement of a cycle of operation of the machine the support assembly 21 occupies a forward position as shown in FIG. 1 where an operator places a last on the last pin 24. When the operation of the machine is commenced cylinder A is operated moving the piston rod 30 to the left as seen in FIG. 2 to cause the levers 34 to pivot counterclockwise thereby straightening the toggle links 46 as shown in FIG. 6. This causes the members 48 to pivot and swing the clamps 56 against opposite side surfaces of the plate 62 (FIG. 22) of an engineered last 64 placed on the last pin 24 by the operator, the plate 62 of the last being supported on the upper face of the support member 22. When the members 56 are clamped against the opposite side surfaces of the plate 62, the last is locked against movement widthwise along axis Z as well as against swinging movement Y1.

Figure 19:
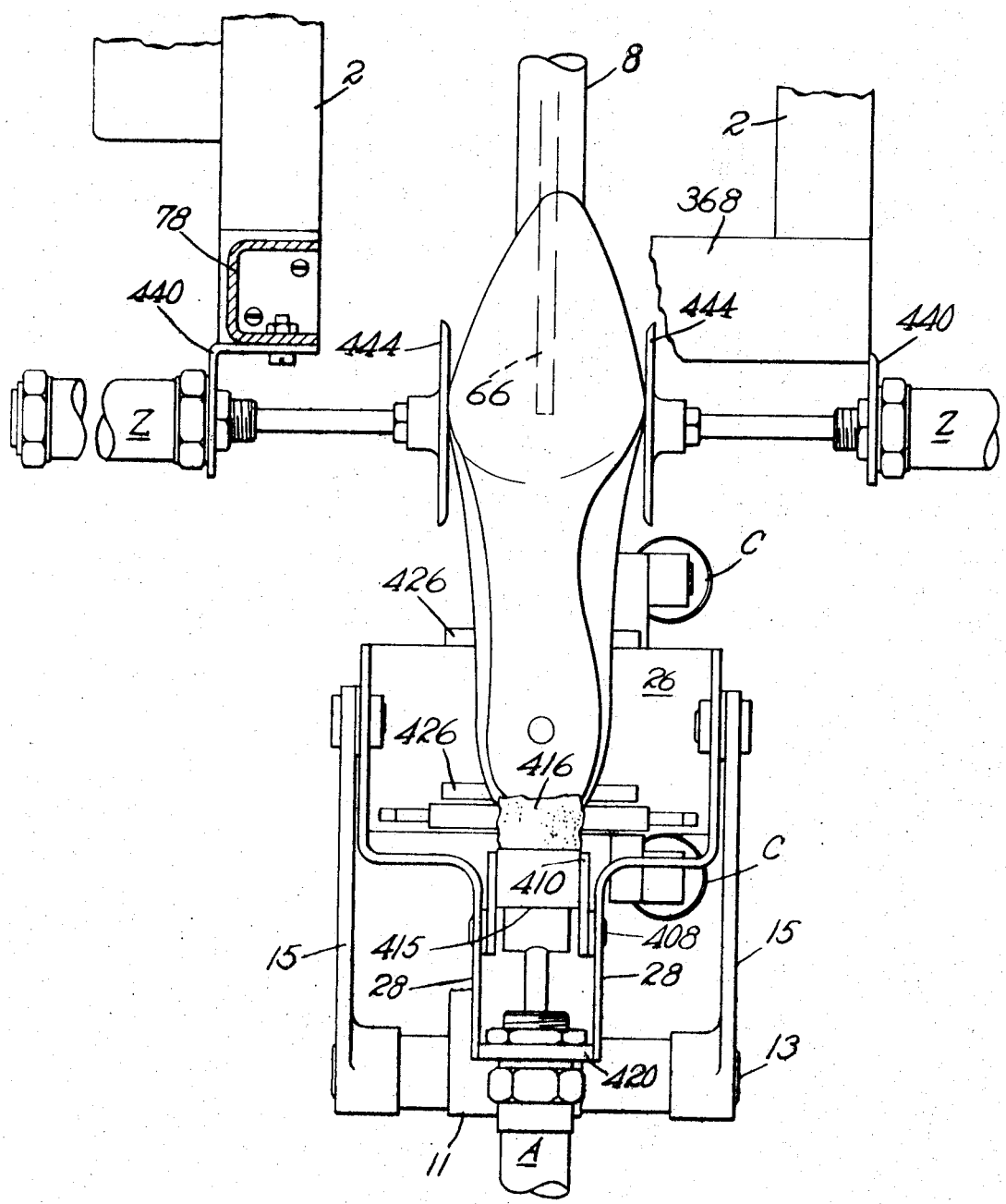
FIG. 19 is a plan view generally similar to FIG. 6, but showing an alternative form of last support adapted for use with a non-engineered last.
Figure 20:
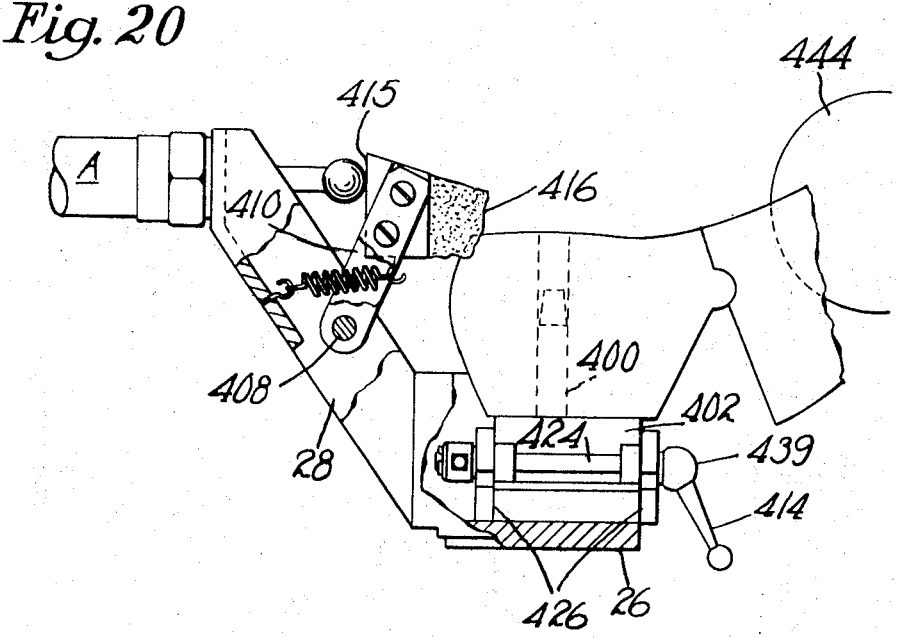
FIG. 20 is a side view of certain of the parts shown in FIG. 19.
Figure 21:
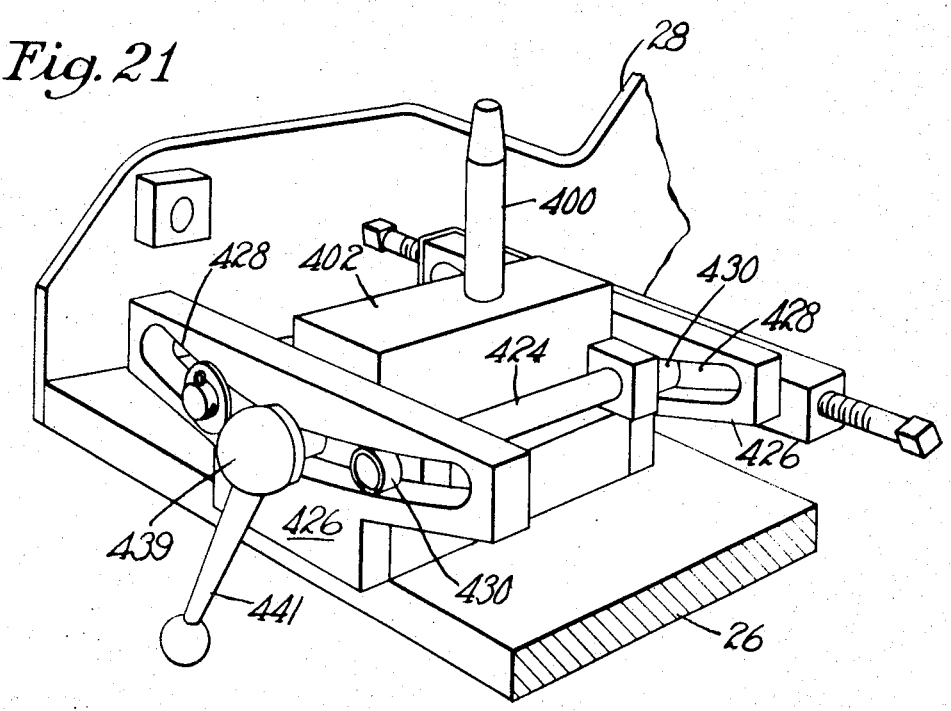
FIG. 21 is a perspective view of last support adjustment means associated with the alternative form of last support.

The shoe support assembly 21 above described is adapted to orient and secure shoes mounted on engineered lasts. It is desirable, however, that the machine also be adaptable to operate on non-engineered lasts. That is, lasts not having an intelligence plate 62 such as that shown in FIG. 22 by which the last may be located in the machine in the directions Z and Y1. Referring to FIGS. 19 to 21, there is shown an alternate form of shoe support assembly for positioning non-engineered lasts in the machine. The alternate support assembly is generally similar to the assembly 21 except that the support member 22 which carries the upstanding last pin 24 (seen in FIGS. 6 and 7) is removed from the plate 26 and in its place there is provided a support member 402 having a last pin 400. The member 402 is provided with rollers mounted on the ends of rods 424 and received in arcuate slots 428 in a pair of upstanding brackets 426 secured to the plate 26 as best seen in FIG. 21. The operator places a non-engineered last on the last pin 400 and by rocking the support member 402 so the rolls 430 move in the slots 428, visually levels the last bottom so that the ball line of the last is in a plane substantially parallel to the plane of operation of the wiper fingers 238. The operator then locks the member 402 in position by means of a clamp bolt 439 having a handle 441.

For positioning the last widthwise in direction Y1, the machine is provided with two cylinders Z (FIG. 19) which are mounted on brackets 440 on the forward upright posts 78 of the machine frame. The piston rods of the cylinders are provided with enlarged heads 444, as best seen in FIG. 19. When the operation of the machine is commenced the cylinders Z are operated so that the heads 444 engage the opposite sides of the shoe centralizing the shoe with respect to the centerline of the machine. A heel pad 416 (FIGS. 19 and 20) then is clamped against the heel end of the last holding the last down on the support member 402 as well as preventing swinging movement of the shoe about the last pin 400 and the heads 444 are withdrawn. For clamping, the heel pad is provided with depending arms 410 which are pivotally mounted on pins 408 in the upstanding arms 28. The piston rod of the cylinder A is provided with a head adapted to engage a surface 415 of the pad 416 to press the pad against the heel end of the shoe. The remainder of the operating sequence of the machine is the same for both forms of shoe support assemblies.

SHOE LOCATING MECHANISM

Figure 18:
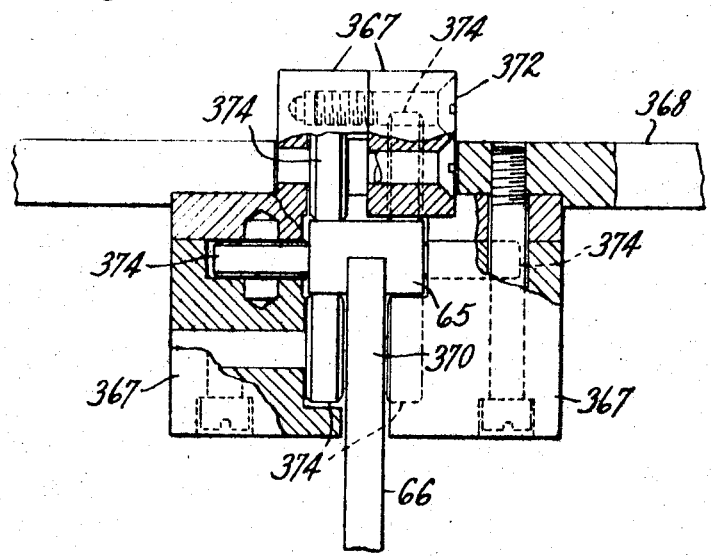
FIG. 18 is a front elevation with parts broken away as viewed in the direction of arrow XVIII of FIG. 2.

The shoe, locked on either support assembly, is thereafter positioned heightwise along axis Y as well as for heightwise swinging movement in direction Z1. To this end, the machine is provided with a bar 66 (FIGS. 1 and 2) having a substantially horizontal serrated surface 72 on its lower side. The bar is provided with two T-shaped portions 65 which are mounted in guide means 67 for movement lengthwise of the shoe. As best seen in FIG. 18, each guide means comprises two blocks 367 which straddle the related portion 65, the blocks being secured together by screws 372 and fixed to plates 368 supported on posts 78 upstanding from the side frame members 2 (see also FIGS. 1 and 2). The blocks 367 are provided with a plurality of rollers 374 which guide the portion 65 of the bar 66. After the operator places a last on the last pin 24 or 400 the bar 66 is moved forwardly to a position overlying the bottom of the shoe. To this end, the machine is provided with a cylinder W (FIG. 1) which is secured to the machine frame. A piston rod 69 extends rearwardly from the cylinder W, and is connected by a tie member 71 to a rod 73 secured to the rearward end of the bar 66 as seen in FIG. 2. By admission of fluid to the cylinder W at the appropriate time, the bar 66 is moved to its most forward position seen in FIG. 1. After the last is secured, the shoe support assembly 21 is moved lengthwise of the shoe aloing axis X (FIG. 22) from the loading position shown in FIG. 1 toward an operating position in the machine. The rearward travel of the shoe support assembly is interrupted when the bottom of the shoe lies under the bar 66. For so moving the assembly the machine is provided with a cylinder B (FIG. 2) which at one end is secured to the side frames 2 by a bracket 68, the other end of the cylinder being fixed to the member 9. A piston rod 70 extends from the cylinder and is connected to the block 10 (see also FIG. 7) which supports the assembly 21. Admission of fluid to the cylinder B at this time moves the block 10 rearwardly along the guide rods 8 until a projection on a rod 162 extending from the block 10 actuates a switch S5 which interrupts flow of fluid to cylinder B and causes fluid to be admitted to the cylinder C. This action raises the support assembly 21 until the ball portion of the shot bottom engages the surface 72 of bar 66 and the heel end of the shoe bottom engages a block 74 pivoted at 76 on the bar 66 actuating a switch S7. In this manner, the shoe bottom is properly oriented in a heightwise direction along axis Y (FIG. 22) as well as for heightwise swinging movement in the direction Z1.

Actuation of switch S7 causes fluid again to be admitted to cylinder B so that the shoe is moved rearwardly into the machine together with the bar 66 which moves along the rollers 74, fluid pressure at this time being exhausted from cylinder W to permit movement of the bar. The shoe is moved rearwardly by cylinder B until a downwardly projecting portion 99 of a sensing finger 98 is engaged by the ball portion of the shoe bottom. The sensing finger is pivoted at 86 on a bracket 80 and has an upstanding arm 94 having a contact 96 forming part of a switch assembly 82 (FIG. 2). A hook-shaped member 88 is also pivoted at 86 and has a switch contact 92. A spring 104 biases the contacts 92 and 96 together and also swings the sensing finger 98 down so that the portion 99 normally projects below the surface 72 of the bar 66. As the sensing finger 98 is swung up upon engagement by the ball portion of the shoe bottom, the entire switch assembly 82 is swung clockwise as seen in FIG. 2 about the pivot 86 with the contacts 92 and 96 closed until the member 88 engages a stop screw 106 causing the contacts to be opened. When the contacts 92, 96 are opened, the operation of cylinder B is ended and further movement of the shoe lengthwise along axis X (FIG. 22) is stopped. The last is now oriented in the machine with the ball portion of the shoe properly located with respect to operating instrumentalities which will act to last the upper about the ball region.

Figure 8:
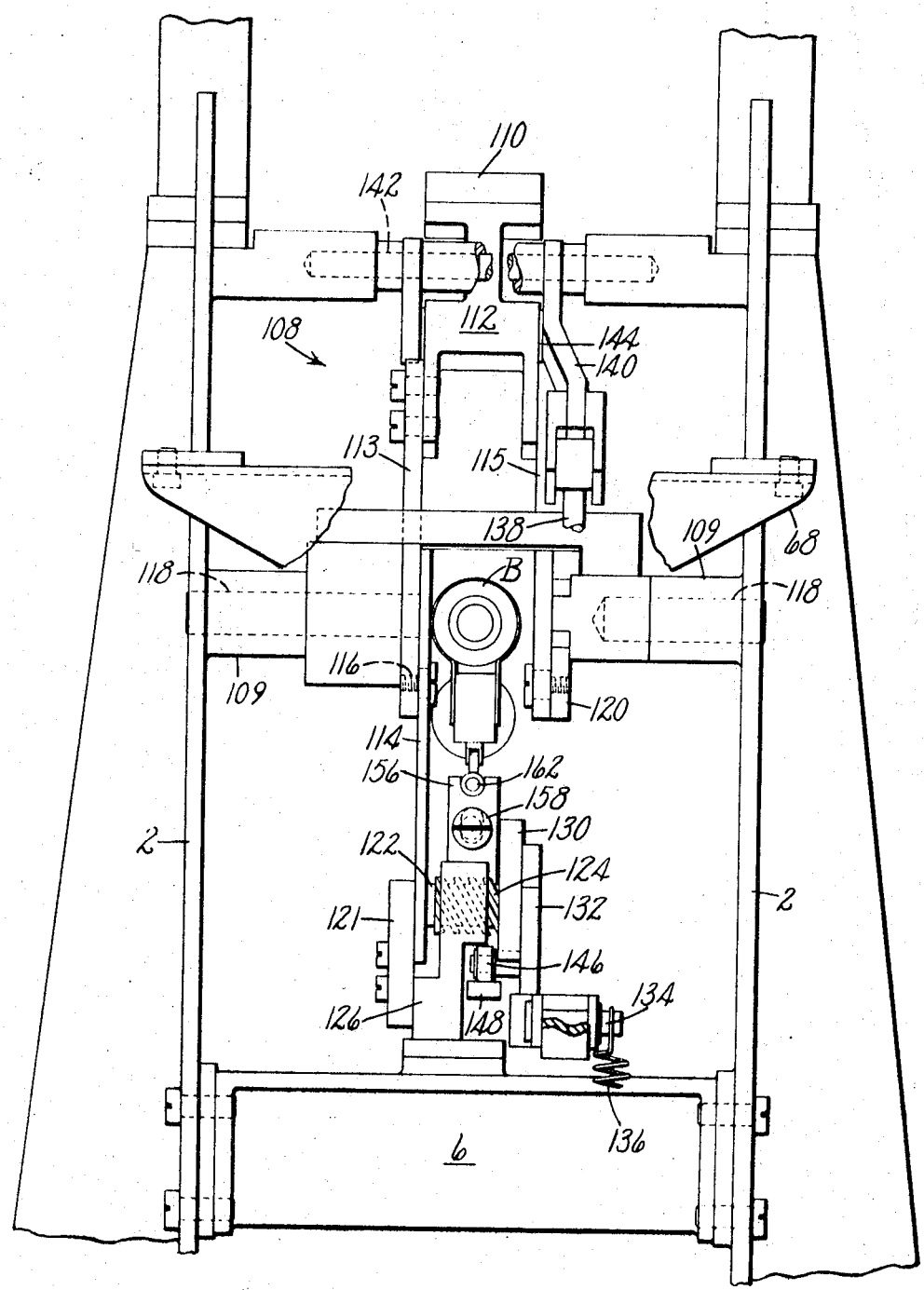
FIG. 8 is an end elevation in the direction of arrow VIII of FIG. 2 showing parts associated with a toe clamping pad of the machine.

The machine is provided with a toe clamp mechanism adapted to support the forepart of the shoe while subsequent lasting operations are performed. To this end a pad 110 adapted to engage the forepart of the shoe is carried by a support 112 (FIGS. 2 and 8) having two depending legs 113, 115. The leg 113 is connected at 116 to an L-shaped plate 114 pivoted on a trunnion 118 extending inwardly from one of the side frames 2 (FIG. 8). The lower end of the other leg 115 of the support is connected to a stiffening link 120 pivoted on another trunnion 118 extending inwardly from the other side frame 2. The upper end of the support 112 is connected at 144 to a forwardly extending arm of a bell crank 140 pivoted on a rod 142 supported by the side frames 2. The other arm of the bell crank is connected to a piston rod 138 extending upwardly from a cylinder F. The lower portion of the plate 114 extends between a block 121 and a stud 122 on the end of a member 124 threaded through a block 126 secured to the bracket 6, in the frame and also carrying the block 121. The threaded member 124 has a flange 130 adjustably secured to the hub of an arm 132 by screw and slot connections 133. The end of the lever 132 is connected at 134 to the lower end of the cylinder F. A spring 136 extending from the machine frame acts to maintain the lever 132 and cylinder F in a lowermost position.

When the switch 82 is opened upon engagement of the sensing finger 98 with the ball portion of the shoe bottom, fluid is also introduced to the upper end of the cylinder F moving the piston rod 138 down swinging the bell crank 140 clockwise as seen in FIG. 2 and raising the toe pad 110 into engagement with the forepart of the last. Continued operation of cylinder F causes the cylinder to move up swinging the lever 132 counterclockwise as seen in FIG. 2 so the threaded member 124 moves to the left as seen in FIG. 8 clamping the plate 114 between the stud 122 and the block 121. In this manner the toe clamp pad is locked against displacement to support the forepart of the last firmly during the lasting operation to be performed upon the ball area of the shoe. The lever 132 is also provided with a roll 146 which, as the lever is swung counterclockwise, moves a block 148 down. The block 148 is carried by a stiff leaf spring 152 attached to one end of a lever 150 pivoted at 154 and having a notch 155 which supports the lower end of a bar 156. The bar has a slot by which it is mounted for heightwise movement on a headed screw 158 extending from the member 9. The upper end of the bar has a notch adapted to engage the rod 162 which extends rearwardly from the block 10 through a bore in the member 9. In this manner, after the toe pad is clamped against the forepart of the shoe it is locked against downward movement by the plate 114 and the shoe support assembly is locked against lengthwise movement by engagement of the plate 156 with the rod 162. Thus, as described above, the shoe is automatically oriented in the machine and restrained against movement in the six possible directions indicated in FIG. 2.

UPPER PULLING MECHANISM

The machine is provided with means for lasting the ball portion of the shoe upper, including gripper assemblies 272 (FIG. 3), insole holddown rods 340 and wiper fingers 238 (FIG. 13). The gripper assemblies 272 (FIG. 3) are arranged at opposite sides of the ball portion of the shoe and each include a pair of jaws 276 and 280 adapted to grip the margin of the upper as shown in FIGS. 15 and 16. The inner jaw 276 is formed on the lower end of an elongated member 274 having adjacent its upper end a lug 275 (FIG. 11) secured to a lug 270 of a sleeve 206 having a rectangular cross-section and mounted for heightwise sliding movement on a block 208. The block 208 is mounted for rotation on a tube 166 (see also FIGS. 4 and 5), the upper end of which is secured to a bracket 164 extending from a part of the machine frame, the lower end of each tube being secured to lugs 168 formed on the side frames 2.

Figure 3:
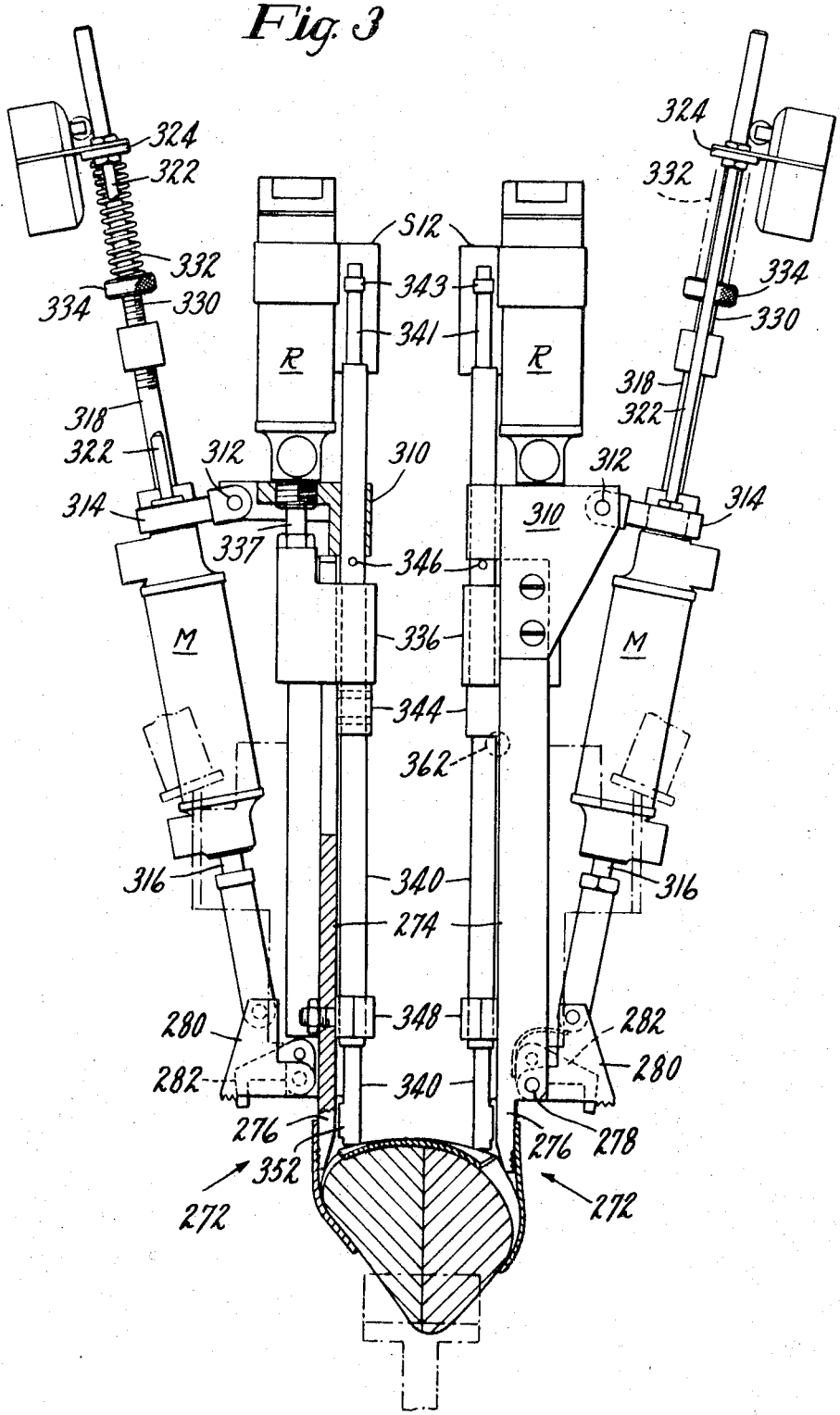
FIG. 3 is a view showing upper gripping means and insole holddown rods of the machine substantially in the direction of arrow III of FIG. 1.

The outer jaw 280 (FIGS. 3, 15 and 16) of each jaw assembly 272 is privoted on a pin 278 on the inner jaw member 270 to swing from the open position shown in FIG. 3 to a closed position shown in FIG. 15 to grip the margin of the upper. The outer jaw 280 is connected to a piston rod 316 extending from a cylinder M the upper end of which is provided with a collar 314 pivoted at 312 on a bracket 310 secured to the inner jaw member 274. The cylinder M is also provided with a piston rod 318 which extends upwardly from the cylinder and carries a threaded rod 330 which passes through a plate 324. The plate is secured by two rods 322 to the collar 314 on the upper end of the cylinder M. The rod 330 carries a spring 332 compressed between the plate 324 and an adjustable stop collar 334 threaded on the rod 330 to urge the piston rod 316 down with respect to cylinder M. At the start of the machine cycle, fluid is supplied to the lower ends of cylinder M to maintain the gripper jaws open and the springs 332 in compressed condition. For initial closing of the jaws, the fluid is released from the lower ends of cylinder M and the springs 332 act to close the jaws under a relatively light pressure on the upper margin for a purpose which will appear.

Figure 5:
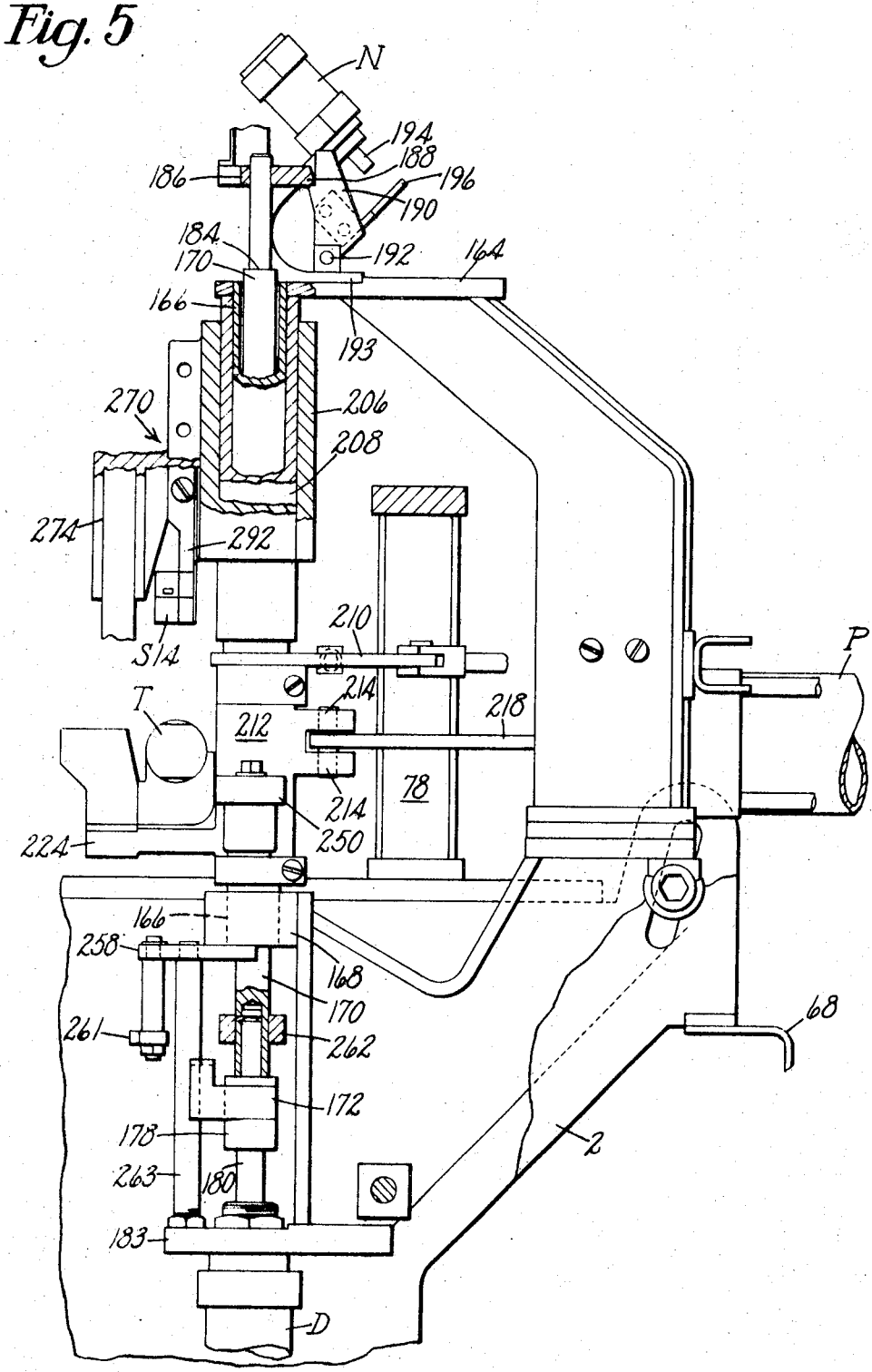
FIG. 5 is a view in right side elevation of the portion of the machine shown in FIG. 4.

The location of the gripper jaws during their closing movements is adapted to grip a greater amount of the upper margin than is necessary. During subsequent upward movement of the grippers the relatively light pressure applied by the springs 332 permits the jaws to slip on the upper until a predetermined amount of the upper is gripped. Thereafter fluid pressure is applied to the upper ends of cylinder M so that the upper is firmly gripped preventing further slipping movement of the jaws on the upper. To this end a detecting finger 282 is pivoted on the pin 278 of each gripper unit. When the jaws are initially closed on the upper the end of the finger passes through a slot 286 of the outer jaw and engages the upper to hold the finger in the position shown in FIG. 15. At this time a rod 288 extending from the finger (see also FIG. 17) is adjacent a switch S14 mounted on a bracket 292 fixed to the lug 275 of sleeve 206 as best seen in FIG. 5. As the jaws slip on the upper during their initial pulling movement, the edge of the upper margin moves beyond the finger 282 which, under the influence of a spring 294, passes through a clearance hole 287 in the inner jaw 276, as seen in FIG. 16 causing the rod 288 to actuate switch S14. As each finger 282 detects the margin of the upper gripped by its associated jaws, closure of associated switch S14 causes fluid to be admitted to the upper end of the corresponding cylinder M to apply a greater force to the gripped jaws preventing further slipping on the upper. In this manner, the edge of the upper margin is sensed individually at opposite sides of the shoe so that the same amount of the upper margin is gripped at opposite sides.

When the shoe is moved rearwardly into the machine and oriented with respect to the ball lasting instrumentalities, the gripper assemblies are held in raised locations out of interfering relationship with the shoe. To this end, the sleeves 206 are connected by rods 204 (FIG. 4) to plates 186. As seen in FIG. 5, each plate 186 is held in an upper position by a latch 190 pivoted on a pin 192.

A cylinder N fixed to a bracket 193 has a piston rod 194 adapted to engage a web 196 extending between the latches 190. After the shoe is properly oriented and fixed in the machine cylinder N is actuated causing the latches 190 to release the plates 186 so that both gripper assemblies drop until the inner jaws 276 (FIG. 3) rest on the insole of the shoe. A constant tension spring 200 (FIGS. 1 and 4) is attached to each plate 186 to provide controlled movement of the grippers as they drop.

When the grippers initially engage the insole they occupy positions spaced inwardly from the insole edges. From these locations the jaws of the grippers are moved apart toward the edges of the insole. To this end each of the blocks 208 have levers 210 (FIGS. 4, 5 and 11) secured thereto. As best seen in FIG. 11, the lever 210 for the gripper assembly at the left outer side of the shoe is connected to the piston rod of a cylinder H, the rearward end of the cylinder being pivotally connected to a portion of the machine frame. Fluid introduced to the cylinder at its forward end causes the entire gripper assembly to swing about the tube 166 until the jaw 276 passes beyond the insole edge and drops down to an extent permitted by an associated insole holddown rod 340 (FIG. 3). Each holddown rod is mounted for axial movement on an associated jaw member 274 and slidably extends through a bore in the bracket 310 secured to the member adjacent its upper end, the rod being slidably received in a block 348 also secured to the member 274 adjacent its lower end. A pin 346 in the rod limits the downward movement of the grippers by engagement with the underside of the bracket 310 as seen in FIG. 3. Each rod also has secured thereto a collar 344 on which rests the lower side of a block 336 secured to a piston rod 337 of a cylinder R fixed on the bracket 310. The cylinder R is inactive at this time, the holddown rods 340 merely serving to limit the downward movement of the gripper jaws 276. When each rod 340 engages the insole, relative movement between the jaw assembly and the holddown rod 340 causes a projection 343 near the upper end of the rod to actuate an associated switch S12 to stop the operation of the associated cylinder H with the gripper 276 in the position shown in FIG. 3. The left gripper assembly 272, as seen in FIG. 3, is associated with its cylinder H while the gripper assembly 272 at the right side is associated with another similar cylinder H seen in FIGS. 1 and 4. The outward movement of each gripper assembly is individually controlled and its outward movement is stopped at the time that the inner gripper jaw 276 passes beyond the insole edge and drops.

Figure 9:
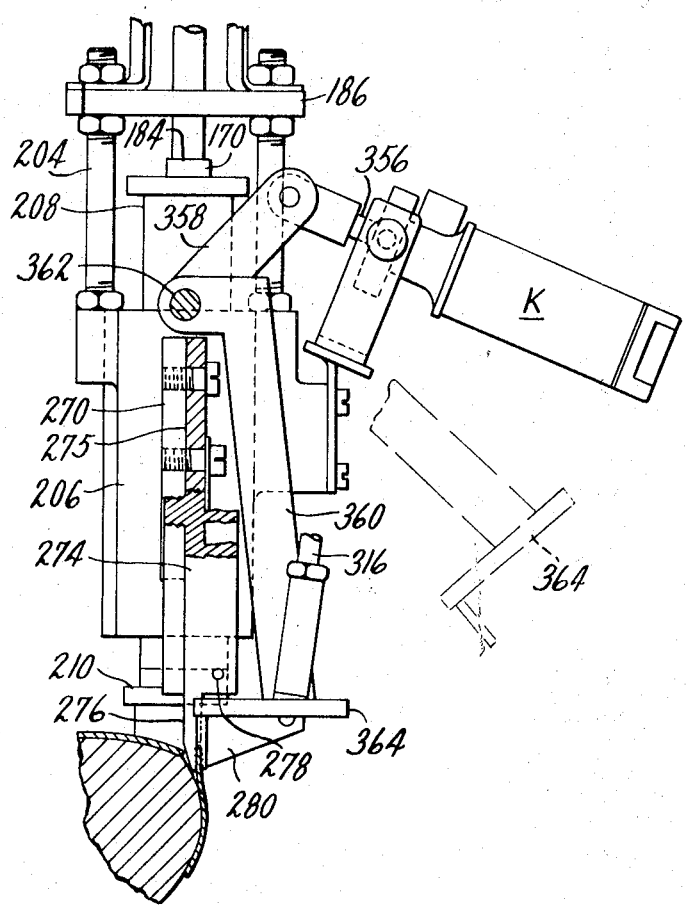
FIG. 9 is a view showing parts associated with an upper gripper assembly and an upper locating member at one side of the machine, as seen in FIGS. 3 and 4.
Figure 17:
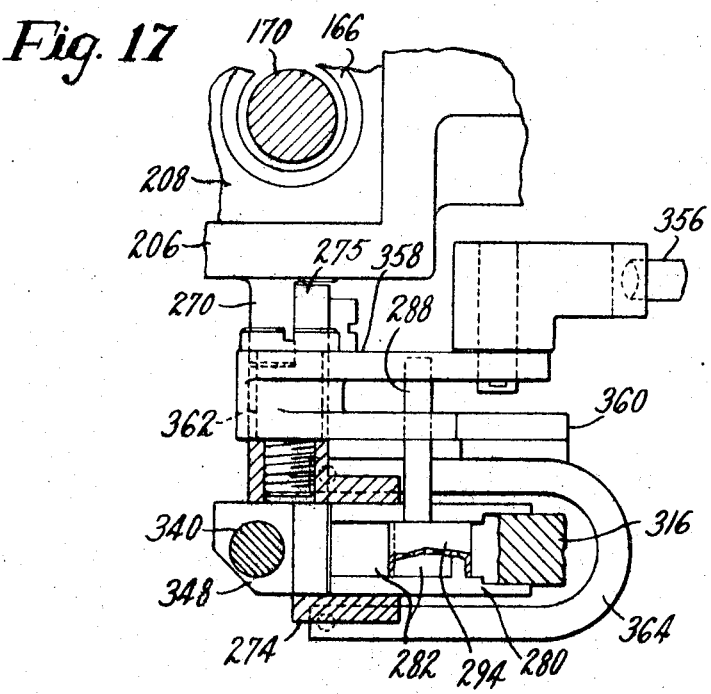
FIG. 17 is a plan view including parts shown in FIG. 16.

When both jaw members 276 have dropped over the edge of the insole causing both switches S12 to be actuated, the margin of the upper at both sides of the shoe is pressed inwardly toward the inner jaws 276 to insure that the upper margin is in a position to be gripped by the outer jaws 280. To this end, each gripper assembly is provided with a member 364 (FIGS. 9 and 17) which is adapted to be moved from the dotted position shown in FIG. 9 to that shown in full lines. The member 364 is U-shaped so as to straddle the gripper jaws, as seen in FIG. 17, and is carried on the lower end of an arm 360 (FIG. 9) of a two-armed lever pivoted on a stud 362 on the inner jaw member 274. The other arm 358 of the lever is connected to a piston rod 356 extending from a cylinder K fixed on the associated sleeve 206 by means of a bracket 354. The gripper assembly at the left side of the machine is provided with a similar cylinder. When both switches S12 are actuated at the time that both gripper jaws 276 drop off the edge of the insole, fluid is introduced to cylinder K causing the members 364 to swing inwardly to gather the upper toward the last and the inner gripper jaws to ensure that the margin of the upper will be properly gripped. Actuation of both switches S12 also causes fluid pressure to be released from the cylinder M so that the grippers are closed with a relatively light force under the action of the springs 332.

Figure 4:
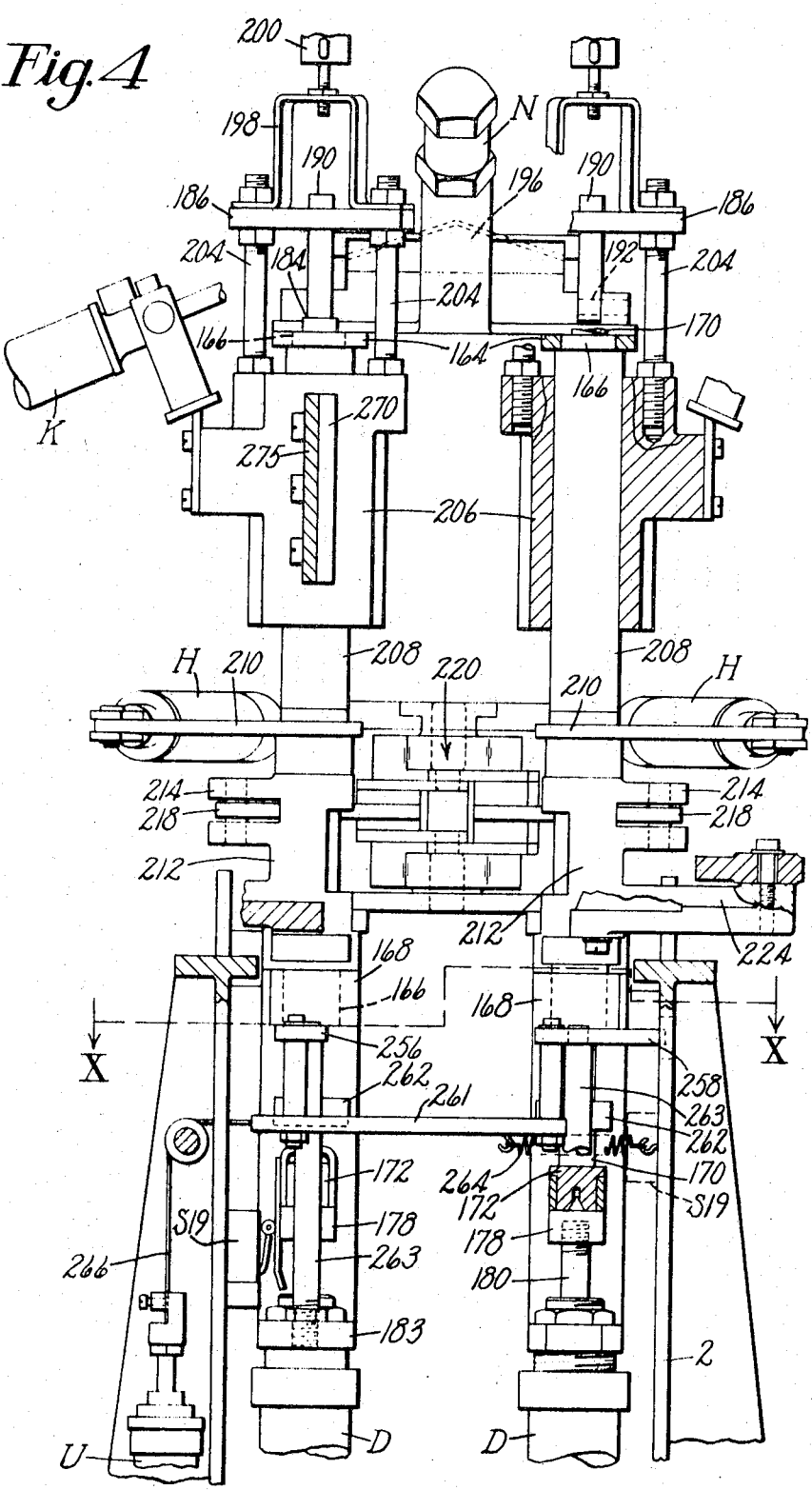
FIG. 4 is a section taken substantially on line IV—IV of FIG. 1, showing operating mechanisms associated with the upper gripping means.

The grippers, after their initial closing, are raised in unison to pull the upper heightwise about the ball portion of the last. To this end, each gripper mechanism is provided with a rod 170 (FIG. 5) which passes freely through the associated tube 166 and adjacent its upper end is provided with a shoulder 184 adapted to engage the underside of the associated plate 188. The lower end of the rod 170 carries a block 172 adapted to rest on a head 178 of a piston rod 180 extending upwardly from a cylinder D. There is a similar cylinder associated with the gripper mechanism at the other side of the machine as seen in FIG. 4 with both cylinders being secured to portions 183 of the side frame members 2. After both sets of grippers are closed, fluid is introduced to the lower ends of the cylinder D and upward movement of the rods 170 through the shoulders 184 raises the plates 186 and hence also both gripper assemblies. As above described, the gripper jaws are closed initially only under the action of the springs 332 so that during initial upward movement, each pair of grippers slip on the upper until the associated sensing finger detects the edge of the upper margin and closes its associated switch S14. This stops the operation of the associated cylinder D to stop the gripper pull and applies fluid pressure to the associated cylinder M so that the upper is firmly gripped preventing further slippage. As each cylinder M is operated to firmly grip the upper, operation of the associated cylinder D is halted momentarily. When both sets of grippers have found the upper margin edge and are firmly gripped on the upper so that both switches S14 are actuated, the operation of both cylinders D continue and the upper is pulled tightly around the last.

Figure 10:
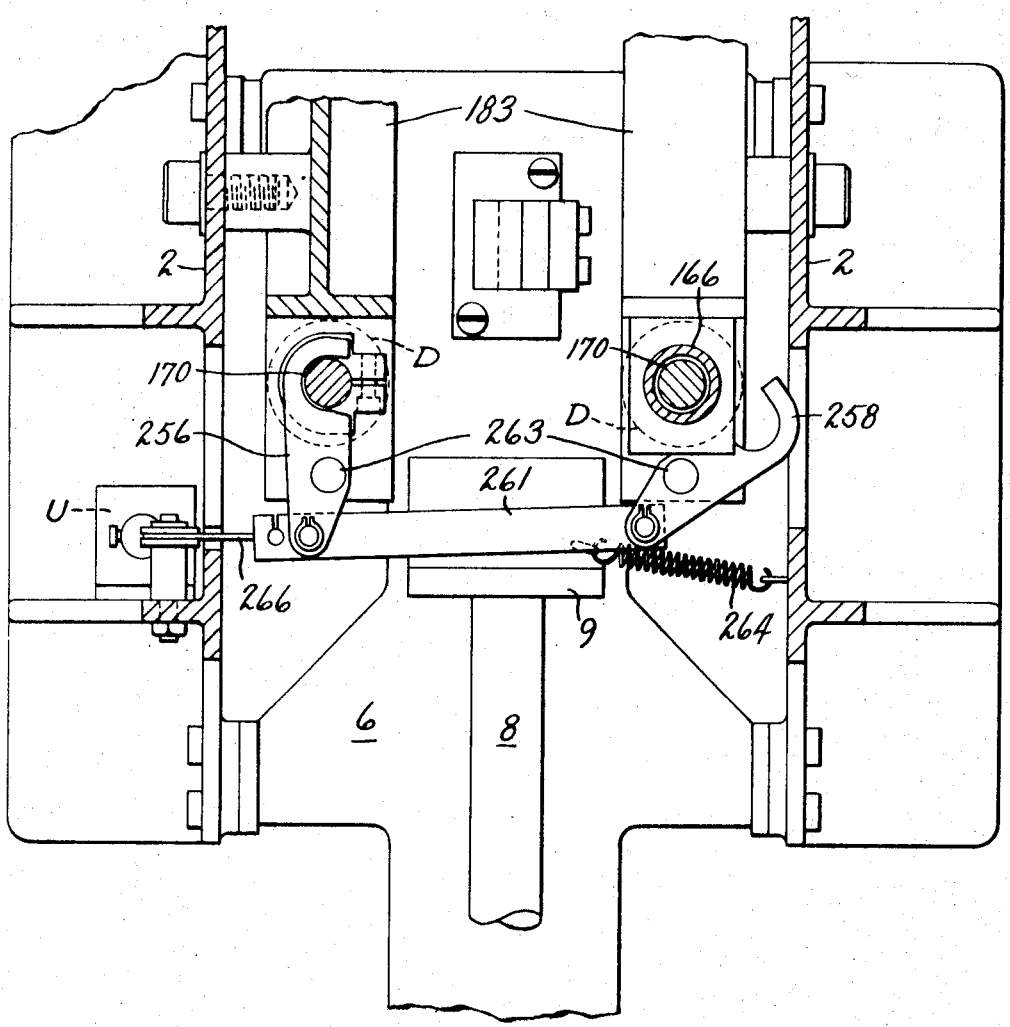
FIG. 10 is a section of line X—X of FIG. 4.

Under normal conditions, it is necessary to pull the upper through a lesser distance on the outer side of the last than on the inner side. Since the inner side of the shoe edge is closer to the median line of the shoe it will be apparent from FIG. 3 that the inner gripper jaw 276 at the right side of the shoe will be first to drop over the edge of the insole. By sensing which gripper drops first, the machine automatically detects whether the shoe is left or right. For a right shoe as shown in FIG. 3, the right hand gripper assembly will drop off the insole edge first and the machine will be conditioned so that the gripper assembly at the left or outer side of the shoe will pull to a lesser extent. To this end, the machine is provided with two hooked-shaped spacers 256, 258 as best seen in FIG. 10, but also shown in FIGS. 4 and 5. Each spacer is pivoted on a post 263 which extends upwardly from the plate 183 which also carries the cylinder D. The forward ends of the spacer are connected by a link 261 and the other hooked-shaped ends are adapted to partially embrace the rods 170 alternately, as shown in FIG. 10. A spring 264 acting on one end of the link 261 normally urges the spacer 258 toward engagement with its associated rod, unless as shown in FIG. 10, operation of a cylinder U secured to the machine frame reverses the positions of the spacers 256, 258. To this end the link 261 is connected by a flexible wire 266 to the piston rod of cylinder U. For the shoe shown in FIG. 3, dropping of the right gripper unit and actuation of its associated switch S12 will cause the cylinder U to be operated so that the spacer 256 will embrace its associated rod 170, as shown in FIG. 10. In embracing position the spacer 256 will limit the stroke of the left hand cylinder D by engagement by a collar 262 (FIG. 5) on the rod 170. Since the stroke of the other cylinder D is not so limited, the upper will be pulled to a greater extent at the inner side of the shoe.

UPPER CLAMPING AND WIPING

The tensioned upper is clamped against the opposite sides of the last by clamp assemblies 226 (FIGS. 12 to 14) and thereafter wiped inwardly over the bottom of the insole by two sets of wiper fingers 238 arranged to operate at opposite sides of the shoe. The clamp assemblies 226 and the wiper fingers 238 at opposite sides of the shoe are similar and are mounted on plates 250 carried on a plate-like arm 224 of a bracket 212 mounted for rotation on the tuebs 166 (see also FIGS. 4 and 5). The plates 250 are adjustably secured to the arms 224 on pivot studs 255 and are fixed to the arms by a screw and slot connection 254. In this manner, the clamp assembly and wiper fingers may be adjusted so as to approach the shoe at a desired angle. Each bracket 212 is provided with an arm 214 connected by a link 218 to a pin 220 (FIG. 12) carried by a piston rod 222 of a cylinder P which is mounted for swing movements on trunnions 225 in the machine frame.

Each clamp assembly 226 includes a pad 228 mounted in an arcuate slideway 229 of a block 230 secured on the plate 250 by screws 252 (FIG. 13). When the grippers approach the upper end of their pulling stroke, the blocks 172 on the rods which cause the grippers to pull the upper heightwise actuate switches S19 (FIG. 4). Actuation of these switches causes fluid to be introduced to the rearward end of cylinder P moving the links 218 forward to swing the clamp assemblies inwardly toward the shoe. As the pads 228 are moved to upper clamping positions one of the pads is likely to engage the upper before the other. Further movement of the piston rod 222, however, continues to swing the other pad 228 into engagement with the opposite side of the shoe, with the cylinder P swinging as required about the trunnions 225. As the pads are pressed against the upper they adjust themselves to the shape of the last by swinging in the arcuate slideways 229.

After the tensioned upper is clamped against the opposite sides of the last, the wiper fingers 238 are moved inwardly to wipe the upper over the insole bottom. Also at this time fluid is introduced to the cylinder R (FIG. 3) so that the blocks 336 acting through the collars 334 press the insole holddown rods 340 firmly against the bottom of the insole. The fluid is also released from the cylinder M at this time so that the grip of the jaw members 276, 280 is relaxed releasing the upper and continued operation of the cylinder R causes the cylinder R to rise carrying with them the gripper jaw assemblies together wtih the sleeves 206 (FIG. 5) which rise sufficiently for the plates 186 to once again be engaged by the latches 190.

The wiper fingers 238 (FIGS. 12 and 13) at each side of the shoe are pivotally mounted on a pin 233 carried by a lug 237 upstanding from a block 234 arranged to slide widthwise of the shoe on a bar 232. As best seen in FIG. 13 the bar is secured at its inner end to the block 230 and at its outer end is supported on the plate 250. Referring to FIG. 12, it may be seen that the block 234 is provided with a lug 236 by which it is connected to the piston rod of a cylinder T secured to a lug on the plate 250. Each finger 238 is provided with an extension 240 which bears against a stiffly resilient pad 242 mounted on the block 234. Introduction of fluid to the outer end of the cylinder T (and to a similar cylinder at the opposite side of the machine) moves the fingers widthwise as a unit so that the inner ends of the fingers wipe the margin of the upper over the insole bottom with each finger exerting an individual resilient wiping pressure caused by its engagement with the pad 242. The central finger of each set of wiper fingers carries a valve 246 having a depressable operating member 248 projecting over the end of the finger. As the fingers advance inwardly over the edge of the insole the member 248 of each valve engages the associated holddown rod 340 and actuates the valve causing the fluid pressure to the cylinder R to be reversed raising the holddown rod out of the path of the advancing wiper fingers. It should be noted that at this time the cylinder R is supported against downward movement since the entire gripper assembly is latched in its uppermost position by the latches 190 (FIG. 5).

The wiping fingers 238 are held in their innermost positions holding the wiped marginal portions of the upper for a predetermined time sufficient to allow adhesive to firmly bond the upper margin to the insole bottom. It should be understood that the adhesive by which the upper is secured to the insole may be preapplied, either to the insole or to the upper margin wtih the machine being provided with means for reactivating the adhesive. Alternatively, the adhesive may be applied or activated just prior to insertion of the shoe in the machine so that the adhesive remains in tacky condition while the machine is operated. At the end of the time in which the wipers are bedded down on the upper, a time delay mechanism in the control system of the machine operates to return all parts of the machine in sequence to their initial positions and the operator removes the lasted shoe from the machine.

Having thus described our invention, what we claim as new and desire to secure by Letters Patent of the United States is:

1. A shoe lasting machine having a gripper mechanism including jaws adapted to grip the margin of a shoe upper, means for closing the jaws on the upper with a relatively light force which permits the jaws to slip on the upper when tension is applied by the grippers, sensing means associated with the jaws to determine arrival of the edge of the upper at a predetermined point in the gripper jaws, and means controlled by the sensing means for applying a greater closing force on the gripper jaws to prevent further slipping of the jaws on the upper upon further tension being applied by the grippers.

2. A gripper mechanism according to claim 1 in which the sensing means comprises a finger biased to engage the upper while the jaws slip on the upper and to actuate control means when the edge of the upper slips beyond the finger.

3. A gripper mechanism according to claim 1 in which the jaw closing means applying said light force comprises a spring and the greater force applying means comprises a fluid operated motor.

4. A shoe lasting machine having grippers arranged to pull the upper margin at opposite sides of a shoe, the gripper at each side of the shoe having individual means for moving the gripper heightwise of the shoe to tension the upper, said gripper being adapted to grip the upper margin with an initial light force permitting the gripper to slip on the upper when tension is applied, sensing means associated with each gripper to detect the arrival of the edge of the upper at a predetermined point in the gripper, means controlled by the sensing means for applying a greater force to the gripper to prevent further slipping on the upper and to stop the operation of the associated gripper moving means, both of said gripper moving means being operated again when both sensing means detect the edge of the upper for tensioning the upper uniformly at opposite sides of the shoe.

5. A machine according to claim 4 in which the initial light force for each gripper is applied by a spring and the greater force applying means comprises a fluid operated motor.

6. A machine according to claim 5 in which the sensing means comprises a finger biased to engage the upper while the grippers slip on the upper and to actuate control means when the edge of the upper slips beyond the finger.

7. A shoe lasting machine having individual grippers adapted to pull the upper margin at opposite sides of a shoe, said grippers in open condition being initially located adjacent the median line of the shoe bottom, individual means for moving each gripper widthwise of the shoe toward the side of the shoe, means for detecting the arrival of each gripper at the side of the shoe and for causing the individual gripper moving means to stop whereby each gripper is individually located to grip the upper margin at one side of the shoe, means controlled by said detecting means for closing each located gripper on the upper margin, and means operable after both grippers are closed for moving the grippers heightwise of the shoe to tension the upper.

8. A shoe lasting machine according to claim 7 in which the gripper closing means applies a relatively light force permitting each gripper to slip on the upper when initial tension is applied, each gripper being provided with sensing means to detect the arrival of the edge of the upper at a predetermined point in the gripper, means controlled by the sensing means for applying a greater force to the gripper to prevent further slipping on the upper, said heightwise gripper moving means also being controlled by the sensing means to stop heightwise movement of each gripper individually as the upper edge is detected and to continue heightwise movement of both grippers after the upper edge is detected at both side of the shoe.

9. A machine according to claim 7 in which the grippers drop heightwise beyond the bottom of the shoe upon arrival at the side of the shoe for gripping an excess portion of the shoe upper margin.

10. A machine according to claim 9 in which the detecting means for each gripper is actuated by the dropping movement of the associated gripper.

11. A shoe lasting machine having individual grippers adapted to pull the upper margin at opposite sides of a shoe, means for positioning a shoe to be lasted in the machine at a location where the median line of the shoe is centered in the machine so that the one or the other of the opposite sides of the shoe is located closer to the center of the machine according to whether the shoe is right or left, said grippers in open condition being located initially adjacent the center of the machine, individual means for moving each gripper outwardly toward one side of the shoe, means for detecting the arrival of each gripper at the side edge of the shoe and for causing the individual gripper moving means to stop and cause the gripper to close on the upper margin, means operable after both grippers are closed for moving each gripper heightwise of the shoe to tension the upper, and means also controlled by the detecting means for limiting the heightwise movement of one or the other of said grippers depending on which gripper first arrives at the shoe edge.

12. A machine according to claim 11 in which the grippers drop heightwise beyond the bottom of shoe upon arrival at the side of the shoe for locating the grippers for gripping the upper margin.

13. A machine according to claim 12 in which the detecting means for each gripper is actuated by the dropping movement of the associated gripper.

References Cited
UNITED STATES PATENTS

| | | | |
|---|---|---|---|
| 2,305,682 | 12/1942 | Eastman | 12—14.5 |
| 2,697,237 | 12/1954 | Hubbard | 12—14.5 |
| 2,730,733 | 1/1956 | Walsh | 12—10.5 |
| 2,768,396 | 10/1956 | Jorgensen | 12—10.5 |
| 3,376,591 | 4/1968 | Gilbride | 12—8.8 |

PATRICK D. LAWSON, Primary Examiner

U.S. Cl. X.R.

12—10.1